Figure 2:
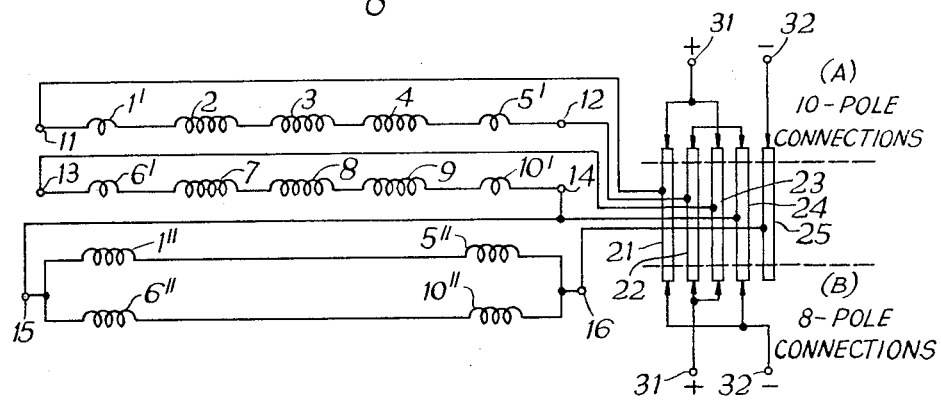

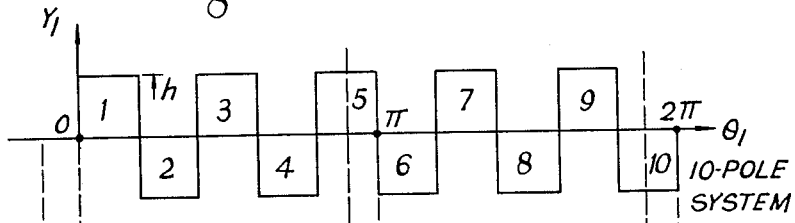
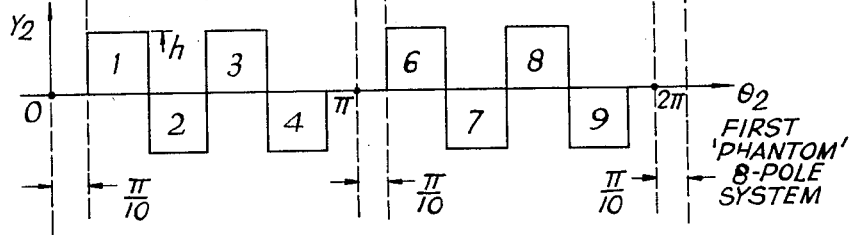
$Y_1 = h(1.275 \sin 5\theta + 0.425 \sin 15\theta + 0.255 \sin 25\theta + 0.182 \sin 35\theta)$
$Y_2 = h(0.272 \sin 2\theta + 0.931 \sin 4\theta - 0.621 \sin 6\theta - 0.068 \sin 8\theta)$
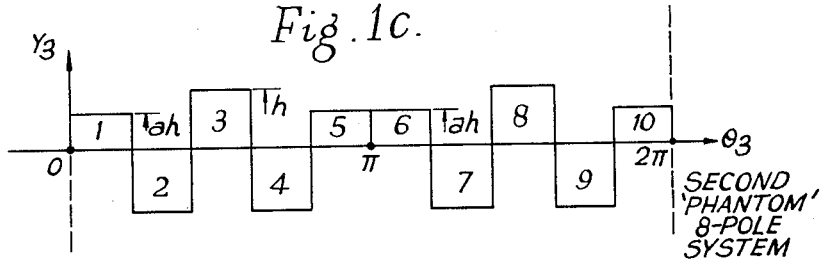
FOR $a = \tfrac{1}{4}$
$Y_3 = h(0.0085 \cos 2\theta + 0.841 \cos 4\theta - 0.561 \cos 6\theta - 0.0021 \cos 8\theta)$ Aug. 14, 1962   G. H. RAWCLIFFE   3,049,653
ROTARY ELECTRIC MACHINES
Filed Nov. 23, 1959   3 Sheets-Sheet 2

INVENTOR
Gordon Hindle Rawcliffe
BY
Stevens, Davis, Miller + Mosher
ATTORNEYS

United States Patent Office 3,049,653
Patented Aug. 14, 1962

3,049,653
ROTARY ELECTRIC MACHINES
Gordon Hindle Rawcliffe, Clifton, Bristol, England, assignor to National Research Development Corporation, London, England
Filed Nov. 23, 1959, Ser. No. 854,653
Claims priority, application Great Britain Dec. 2, 1958
5 Claims. (Cl. 318—173)

This invention relates to rotary electric machines having an alternating current winding. In particular, this invention relates to synchronous electric motors or generators having a direct current winding and a 3-phase alternating current winding. The 3-phase alternating current winding is constructed and switched to provide alternative numbers of poles by a method referred to as "pole amplitude modulation."

A general explanation of the theory of pole-changing by pole amplitude modulation, together with a number of practical examples as applied to 3-phase induction motors, in particular, is given in patent application No. 757,029. The method of pole amplitude modulation described in that specification and the method with which the present application also is concerned relates to alternative pole-numbers neither of which is a multiple of three.

The theory underlying the method of pole amplitude modulation will not be repeated in the present specification and it is sufficient to say that a 3-phase machine adapted for pole-changing by this method has the three phase-windings wound normally to provide one of the alternative pole-numbers. That is, for unmodulated operation, each phase-winding provides poles of alternate polarity round the armature in the normal manner.

For modulated operation, to provide the other of the alternative pole numbers, half of each phase-winding is switched for reverse current flow therein. That is, the second half of each phase-winding is reversed relatively to the first half or the second and fourth quadrants are reversed relatively to the first and third quadrants, and so on.

Additionally, one pole at one end or the other of each half or quarter phase-winding is entirely omitted from circuit. Alternatively, both end poles of each half or quarter phase-winding are reduced in amplitude, by the omission of one or more coils from the coil group concerned or by neutralisation. The result is a modified M.M.F. waveform which contains two M.M.F. components one of which corresponds to a pole-number higher than the original pole-number and the other of which corresponds to a pole-number lower than the original.

By arranging that the three phase-windings are spaced by 120° mechanical around the axis of the machine, one of the M.M.F. components, corresponding to either the higher or the lower pole-number created, is cancelled out in the resultant 3-phase rotating field. This leaves the other of the pole-numbers created by modulation as the operative alternative pole-number. As indicated, this modulated pole-number may be either higher or lower than the original pole-number.

The 3-phase alternating current windings provided by pole amplitude modulation are well suited for use in other rotary electric machines besides induction motors and in particular they may be used in synchronous machines having a direct current winding and a 3-phase alternating current winding.

It is well-known, in relation to synchronous electric machines, that "phantom" D.C. poles may be created in the direct current field system of the machine by neutralising or omitting the excitation of some of the D.C. poles and reversing the excitation of others. In the direct current system of a synchronous machine, the number of poles can, in principle, be changed in this way without limit or restriction. Nevertheless, the most satisfactory results are obtained when the ratio of alternative pole numbers has a quotient which does not differ greatly from unity, for example, lying between the limits of 0.8 and 1.25.

In known synchronous machines having a direct current field system with "phantom" D.C. poles to provide two alternative pole-numbers, the direct current winding is matched with a stationary polyphase alternating current winding which may be switched in conventional manner to provide alternative pole-numbers, or the direct current winding is matched with two independent alternating current windings.

The use of known switched pole-changing windings, usually involves bringing out an excessive number of loads for switching the windings and the use of two independent windings is obviously wasteful of space and material. The 3-phase alternating current winding of such a known synchronous machine may, with advantage, be replaced by a pole amplitude modulated winding as described above.

In order that the invention may be readily carried into effect, several practical embodiments will now be described, by way of example, with reference to the drawings accompanying this specification, of which—

FIGURES 1A and 1B show a ten pole winding and an eight pole phantom winding and FIGURE 1C shows the phantom 8-pole winding modified according to this invention.

FIGURES 2, 3, 4, and 5 show alternative physical arrangements of the D.C. winding and the alternative switching connections to provide a 10-pole field corresponding to FIG. 1A and an 8-pole field corresponding to FIG. 1C.

The known D.C. winding adapted to provide phantom D.C. poles in one mode of operation suffers from the disadvantage that, in the phantom pole mode of operation, the M.M.F waveform of the field contains a substantial subharmonic content. This disadvantage will be explained more clearly by reference to FIG. 1 of the accompanying drawings, wherein FIG. 1A shows a 10-pole D.C. winding having ten coils 1 to 10, in normal operation, each producing a pole of the same amplitude indicated at $h$ in the drawing. FIG. 1B shows the same winding operated to provide eight poles. To this end, two of the coils, coil No. 5 and coil No. 10, are omitted from circuit and one half of the residual winding, comprising coils 6, 7, 8 and 9 is reversely connected in circuit so that the current therein flows in the reverse direction from the 10-pole connection, thus providing corresponding poles 6, 7, 8 and 9 of opposite polarity. In FIGS. 1A and 1B, the poles are numbered according to the number of the winding producing the pole.

In the connection of the winding according to FIG. 1A, the field ($Y_1$) is given by the expression:

$$Y_1 = (\sin 5\theta)$$

assuming a sinusoidal flux distribution or, assuming a uniform flux distribution as indicated in the figures, $$Y_1 = h(1.275 \sin 5\theta + 0.425 \sin 15\theta$$
$$+ 0.255 \sin 25\theta + 0.182 \sin 35\theta)$$

The field ($Y_2$) according to the connection of FIG. 1B is given by the expression:

$$Y_2 = h(0.272 \sin 2\theta + 0.931 \sin 4\theta$$
$$- 0.621 \sin 6\theta - 0.068 \sin 8\theta)$$

again assuming uniform flux distribution.

From these expressions, it will be perceived that the 4-pole sub-harmonic has an amplitude of about one quarter of the 8-pole field. The presence of the subharmonic flux is undesirable since it exerts a bending effect upon the frame of the machine.

The object of the present invention is to provide a D.C. field winding, for use in a synchronous rotary electric machine, having an improved performance as regards the above-mentioned disadvantages of the known phantom pole D.C. winding.

The novel D.C. field winding may be used with an A.C. pole-changing winding of traditional form, but it is preferred to use the novel D.C. field winding with an A.C. winding providing pole-changing by the method of pole-amplitude modulation referred to above.

Accordingly, the invention provides, in a synchronous motor or generator having a pole-changing A.C. winding, a D.C. field system wound and connected to provide phantom D.C. poles in one mode of operation, the said D.C. field winding being provided in two halves each half winding extending 180° (mechanical), subtended at the armature axis, the winding being operated, in the mode of operation providing phantom D.C. poles, by the reversal of one half of the winding relatively to the other half, and reduction in amplitude of each of the four poles at the ends of the two half windings. This reduction in amplitude may be effected by the omission from circuit of some of the turns of each of the four coils located at the ends of the two half windings or by neutralisation of the said coils. It is preferred, for each of the end coils from which turns are omitted from circuit, to omit approximately three quarters of the turns. More exactly, that number of turns is omitted from circuit which provides an amplitude of the diminished pole equal to 23.6% of the amplitude of the undiminished poles. Correspondingly, by the method of neutralisation, the end poles are similarly diminished to 23.6% amplitude.

In order that the invention may readily be carried out in practical form, reference is made to FIG. 1C of the accompanying drawings, which shows the winding of FIG. 1A modified to provide a phantom 8-pole winding according to the invention. In this mode of operation, the half of the winding comprising coils 6 to 10 inclusive is reversed with respect to the half winding comprising coils 1 to 5. Additionally, the poles 1, 5, 6 and 10 are reduced in amplitude, the poles 1 and 5 being produced by the coils 1 and 5 at the ends of the first half of the winding and the poles 6 and 10 being produced by the coils 6 and 10 at the ends of the second half of the winding. The residual amplitude of the poles 1, 3, 6 and 10 is indicated in FIG. 1C by the amplitude $ah$. The amplitude of the undiminished poles 2, 3, 4, 7, 8 and 9 remains at the value $h$ as in FIG. 1A.

For the omission from circuit of three quarters of the turns of each of the coils 1, 5, 6 and 10, so that the value $ah$ equals $\frac{1}{4}h$, the distribution of the field ($Y_3$) is represented by the expression:

$$Y_3 = h(0.0085 \cos 2\theta + 0.841 \cos 4\theta - 0.561 \cos 6\theta - 0.0021 \cos 8\theta)$$

This expression assumes that each turn of the winding contributes equally to the amplitude of the corresponding pole. In the preferred case, in which turns are omitted from circuit in the coils 1, 5, 6 and 10, or they are neutralized to such an extent that the residual amplitude $ah$ equals $0.236H$, the turn in $\cos 2\theta$ vanishes entirely from the expression for the distribution of the field, leaving a field the major component of which is the required 8-pole field. This is the preferred arrangement of a D.C. phantom pole winding according to the invention.

Alternative physical arrangements of the D.C. winding and the alternative switching connections to provide a 10-pole field corresponding to FIG. 1A and an 8-pole field corresponding to FIG. 1C are shown in FIGS. 2, 3, 4 and 5 of the accompanying drawings, wherein corresponding elements are indicated by the same reference numerals. In each figure, the D.C. winding is assumed to be the rotor winding of the machine and connections from the winding are brought out to the required number of sliprings. The sliprings are shown on the right-hand side of each figure and both the alternative connections are shown in each figure, the 10-pole connections being shown above the sliprings and the 8-pole connections below.

In FIG. 2, a 10-pole D.C. winding comprises ten coils 1 to 10 arranged as two half windings comprising coils 1 to 5 and coils 6 to 10 respectively. The coils 1, 5, 6 and 10, the coils at the ends of the two half windings, are each wound in two parts, the smaller part 1', 5', 6' and 10' each comprising one quarter of the full coil turns and the other part 1", 5", 6" and 10" each comprising the remaining three quarters of the turns. The coils 1', 2, 3, 4 and 5' are connected in series between terminals 11 and 12 and the coils 6', 7, 8, 9 and 10' are connected in series between terminals 13 and 14. The coils 1" and 5" are connected in series with each other and the coils 6" and 10" are connected in series with each other, the two series combinations being connected in parallel between terminals 15 and 16. Terminal 11 is connected to a first slipring 21, terminal 12 to a second slipring 22 and terminal 13 to a third slipring 23. Terminals 14 and 15 are connected together and to a fourth slipring 24 and terminal 16 is connected to a fifth slipring 25.

For each mode of connection, in all of the FIGS. 2 to 5, the D.C. winding is supplied with current from a current source having its positive pole at terminal 31 and its negative pole at terminal 32. For the 10-pole connection, sliprings 22 and 24 are connected together, sliprings 21 and 23 are connected together and to terminal 31 and slipring 25 is connected to terminal 32. For the 8-pole connection, sliprings 22 and 23 are connected together and to terminal 31, sliprings 21 and 24 are connected together and to terminal 32 and slipring 23 is isolated.

Figure 3:
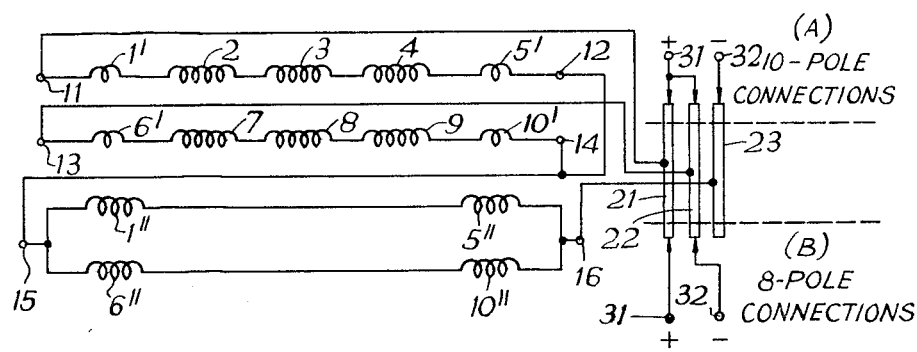

In FIG. 3, the arrangement of the coils 1 to 10 and their connections to terminals 11 to 16 are the same as in FIG. 2. Similarly, the coil parts 1', 5', 6' and 10' each contain one quarter of the full turns of the respective coils and the coil parts 1", 5", 6" and 10" each contain three quarters of the turns. In the arrangement of FIG. 3, however, only three sliprings are required, the terminals 12, 14 and 15 being connected together permanently without a connection to a slipring. Terminal 11 is connected to slipring 21, terminal 13 is connected to slipring 22 and terminal 16 is connected to slipring 23. For the 10-pole connection, sliprings 21 and 22 are connected together and to terminal 31, terminal 32 is connected to slipring 23. For the 8-pole connection, terminal 31 is connected solely to slipring 21 and slipring 22 is connected to terminal 32; slipring 23 is isolated.

Figure 4:
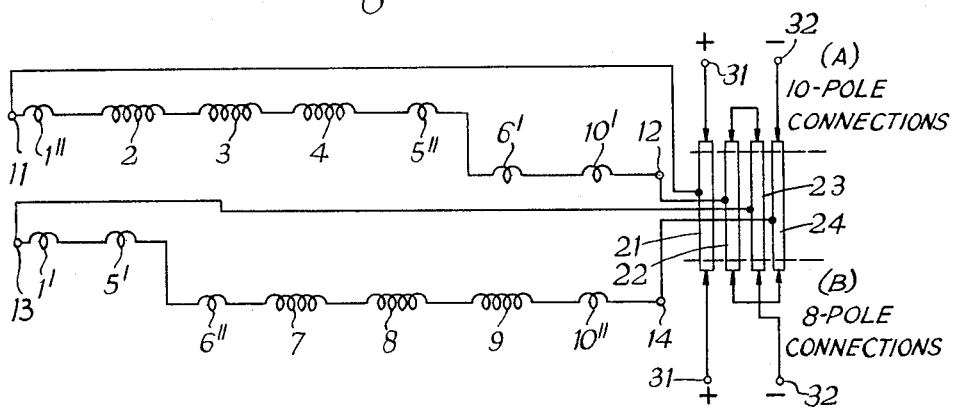
Figure 5:
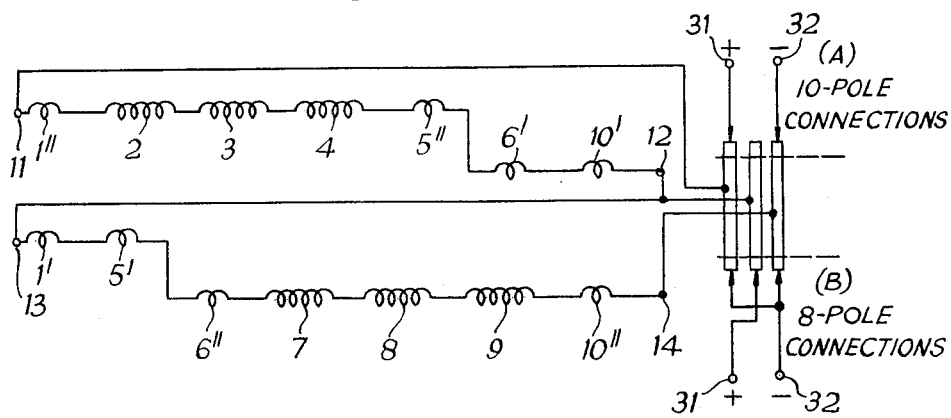

FIGS. 4 and 5 show an alternative construction of D.C. winding in which the field distribution of FIG. 1C is obtained by coil neutralisation. As in the arrangements of FIGS. 2 and 3, the coils 2, 3, 4, 7, 8 and 9 each contain the full number of turns. The coils 1, 5, 6 and 10, the coils at the ends of the two half windings, each comprise two parts. The parts 1', 5', 6' and 10' each contain three eighths of the total turns of the winding and the coil parts 1", 5", 6" and 10" each contain the remaining five eighths of the turns.

In the arrangement of the coils shown in FIG. 4, the full coils 2, 3 and 4 together with the coil parts 1", 5", 6' and 10' are all connected in series between terminals 11 and 12. The full coils 7, 8 and 9 together with the coil parts 1', 5', 6" and 10" are all connected in series between terminals 13 and 14. Terminal 11 is connected to a slipring 21, terminal 12 to a slipring 22, terminal 13 to a slipring 23 and terminal 14 to a slipring 24. In the 10-pole connection, sliprings 22 and 23 are connected together, terminal 31 is connected to slipring 21 and terminal 32 is connected to slipring 24. In the 8- pole connection, sliprings 22 and 24 are connected together, terminal 31 is connected, as before, to slipring 21 and terminal 32 is connected to slipring 23.

In the arrangement of FIG. 5, the coils or coil parts 1", 2, 3, 4, 5", 6' and 10' are similarly connected in series between terminals 11 and 12 and the coils or coil parts 1', 5', 6", 7, 8, 9 and 10" are similarly connected in series between terminals 13 and 14. Terminal 11 is connected to slipring 21, terminals 12 and 13 are connected together and to slipring 22 and terminal 14 is connected to slipring 23. For the 10-pole connection, terminal 31 is connected to slipring 21 and terminal 32 is connected to slipring 23; slipring 22 is isolated. For the 8-pole connection, terminal 31 is connected to slipring 22. Sliprings 21 and 23 are connected together and to terminal 32.

The above practical examples relate to machines adapted to provide two alternative pole numbers, by both the D.C. field winding and the 3-phase A.C. winding, wherein the alternative pole numbers differ by two poles. This involves splitting all four windings involved, the three A.C. phase-windings and the D.C. field windings, into two halves and reversing the direction of current flow in one half winding relatively to the other half winding, upon modulation, together with the elimination or neutralisation of turns corresponding to end poles of the half windings, in order to eliminate or reduce the amplitude of end poles, as the case may be.

Reference is made in the introductory part of this specification to pole-changing, 3-phase A.C. windings using the method of pole amplitude modulation in which each phase-winding is divided into quadrants, for example. The modulated condition of operation then involves reversal of current direction in the second and fourth quadrants relatively to the first and third, together with the required amplitude reduction of end poles of every quadrant. If a synchronous motor, for example, employs a 3-phase A.C. winding divided into quadrants, the D.C. field winding must similarly be divided into quadrants to provide the same change of pole-number upon modulation.

The D.C. field winding of FIGS. 1a and 1c may be regarded as a single cycle winding in that, in the modulated condition, there is one complete cycle of pole-reversal and pole amplitude reduction around the 360° of the armature perimeter. This cycle may be repeated two, three, four or more times around the 360° of the armature perimeter to correspond, respectively, with a 3-phase A.C. winding in which the corresponding cycle is repeated two, three, four or more times in each of the three-phase windings. This modification provides modulated pole-numbers differing from the unmodulated pole-numbers by two, three, four or more pole pairs respectively.

What I claim is:

1. For a synchronous rotary electric machine of the type having pole-changing A.C. and D.C. windings to provide first and second alternative pole numbers, a D.C. winding comprising two halves, each half extending 180° (mechanical) subtended at machine axis, each half winding being wound to provide an equal number of poles and current supply connections providing, for said first pole number, poles of uniform spacing and uniform amplitude, and providing, for said second pole number, reversal of the direction of current flow in one said half winding relatively to the other said half winding and energisation of the poles at each end of each said half winding at diminished amplitude relatively to the undiminished poles not at the end of either said half winding.

2. A D.C. winding as claimed in claim 1, in which the said current supply conductors provide, for said second pole number, energisation of the said end poles of each half winding at an amplitude in the range one-fifth to one-third the amplitude of the said undiminished poles.

3. A D.C. winding as claimed in claim 2, in which the said current supply conductors provide, for said second pole number, energisation of the said end poles of each half winding at an amplitude substantially 24% of the amplitude of the undiminished poles.

4. A D.C. winding as claimed in claim 1, in which the said current supply conductors are arranged, for said second pole number, to omit from circuit some, but not all, of the parts of each said half winding corresponding to the end poles thereof.

5. A D.C. winding as claimed in claim 1, in which the parts of each said half winding corresponding to the end poles thereof have supply conductors connected for separate current supply to a major portion and the minor portion thereof, said supply conductors providing, for this first pole number, current flow in the same sense in both major and minor portions and, for the second pole number, current flow in the minor portion in opposite sense to that in the major portion and to that for the undiminished poles.

References Cited in the file of this patent
UNITED STATES PATENTS
Re. 18,811    Alger _____ May 2, 1933